United States Patent
Graczyk et al.

(10) Patent No.: US 10,359,112 B2
(45) Date of Patent: Jul. 23, 2019

(54) PISTON RING SET FOR INTERNAL COMBUSTION ENGINE AND SYSTEM AND METHOD THEREOF

(71) Applicant: Progress Rail Locomotive Inc., La Grange, IL (US)

(72) Inventors: Frank M. Graczyk, Darien, IL (US); Farhan F. Devani, Morton Grove, IL (US); Edward J. Cryer, III, Homer Glen, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 131 days.

(21) Appl. No.: 15/082,766

(22) Filed: Mar. 28, 2016

(65) Prior Publication Data
US 2017/0276246 A1    Sep. 28, 2017

(51) Int. Cl.
*F16J 9/12*    (2006.01)
*F02F 1/00*    (2006.01)
*F02F 3/28*    (2006.01)

(52) U.S. Cl.
CPC ............... *F16J 9/12* (2013.01); *F02F 1/004* (2013.01); *F02F 3/28* (2013.01)

(58) Field of Classification Search
CPC ............... F16J 9/12; F02F 3/28; F02F 1/004
See application file for complete search history.

(56) References Cited

U.S. PATENT DOCUMENTS

| | | | | |
|---|---|---|---|---|
| 3,542,376 A * | 11/1970 | Dykehouse | ............... | F16J 9/00 |
| | | | | 277/444 |
| 3,751,047 A * | 8/1973 | McGee | ............... | F16J 9/06 |
| | | | | 277/468 |
| 4,106,463 A | 8/1978 | Curtis, Jr. et al. | | |
| 5,265,565 A * | 11/1993 | Bando | ............... | F16J 9/00 |
| | | | | 123/193.4 |
| 5,598,763 A * | 2/1997 | Rao | ............... | F16J 1/08 |
| | | | | 277/442 |
| 6,199,868 B1 * | 3/2001 | Evans | ............... | F16J 9/06 |
| | | | | 277/467 |
| 6,715,767 B1 * | 4/2004 | Meernik | ............... | F16J 9/14 |
| | | | | 277/459 |
| 8,555,850 B2 * | 10/2013 | Ma | ............... | F02F 5/00 |
| | | | | 123/193.6 |

(Continued)

FOREIGN PATENT DOCUMENTS

| | | |
|---|---|---|
| CN | 203906109 U | 10/2014 |
| CN | 204344302 U | 5/2015 |

(Continued)

*Primary Examiner* — Joseph J Dallo
*Assistant Examiner* — Kurt Philip Liethen
(74) *Attorney, Agent, or Firm* — Bookoff McAndrews (57) ABSTRACT

A piston ring set for internal combustion (IC) engine is provided. The IC engine includes a cylinder having a liner and a finish on the liner. A piston having a crown and a set of grooves is disposed in the cylinder. A set of piston rings is disposed in the set of grooves. The piston rings are disposed in order from closest to the crown and include at least a first compression ring having free ends defining a first end gap, a second compression ring having free ends defining a second end gap. A nominal value of the first end gap of the first compression ring is greater than a nominal value of the second end gap of the second compression ring.

18 Claims, 6 Drawing Sheets

(56) References Cited

U.S. PATENT DOCUMENTS

2007/0261658 A1* 11/2007 Abe .................. F16J 1/09
　　　　　　　　　　　　　　　　　　123/193.6
2014/0000549 A1*  1/2014 Graczyk .......... F16J 9/206
　　　　　　　　　　　　　　　　　　123/193.4
2014/0076265 A1   3/2014 Mittler

FOREIGN PATENT DOCUMENTS

| JP | 11-201283 | 7/1999 |
| JP | 2010-38295 | 2/2010 |
| WO | WO 2009/074069 A1 | 6/2009 |
| WO | WO 2012/113417 A1 | 8/2012 |

* cited by examiner

PISTON RING SET FOR INTERNAL COMBUSTION ENGINE AND SYSTEM AND METHOD THEREOF

TECHNICAL FIELD

The present disclosure generally relates to an internal combustion engine, and more particularly relates to a piston ring set for an internal combustion engine.

BACKGROUND

Generally, engines used in Power, Marine and Industrial (P, M & I) application are continually subjected to stricter emissions levels. The engines in these applications typically include a piston and a cylinder liner developed to meet Tier-3 levels of emission standards. Wear of particular rings of a piston ring set can cause non-compliance with emission standards, oftentimes more quickly than desired.

For example, an increased wear rate of the piston ring set may be caused due to ring-to-piston groove side clearance under P, M & I operations (and even rail operations). The P, M & I operations are well known for their extreme service levels at relatively high engine outputs. Power assemblies, including piston compression rings and oil rings on the piston demonstrating sporadic high ring-to-piston groove, can be subjected to relatively high wear rates. Thus the piston compression rings and oil rings are frequently replaced prior to customer-expected life cycle. The frequent replacement of the piston compression rings and oil rings may lead to customer dissatisfaction. Likewise, such premature removal, can increase warranty costs, and when not detected or remedied in time, may result in significant, related subsequent engine damage and loss of engine availability, not to mention emissions standards non-compliance.

China Patent Publication Number 2,043,44,302 describes an engine piston assembly. The engine piston assembly is provided with a piston structure and a piston ring set matched with the piston structure. The piston structure, the piston ring set and the inner wall of an air cylinder together form a residual gap channel which is provided with at least one or more annular sudden expansion swelling cavities and has the function of multi-stage throttling swelling. When mixed gas in an engine is compressed and ignited for combustion and swells for doing work, the residual gap channel will generate flow resistance and an energy dissipation effect in an effort to prevent the high-pressure mixed gas and high-temperature high-pressure fuel gas from fleeing or leaking from a combustion chamber and an air cylinder of the engine to a crankcase, with only a small amount of hydrocarbon emissions escaping from the residual gap. The engine piston assembly is provided to reduce carbon deposits inside the cylinder of the engine and hydrocarbon emissions in tail gas emissions.

SUMMARY OF THE DISCLOSURE

In one aspect of the present disclosure, an internal combustion engine is provided. The internal combustion engine includes a cylinder including a liner and a finish on the liner. The internal combustion engine further includes a piston disposed in the cylinder, the piston including a crown and a set of grooves having six grooves. The internal combustion engine further includes a set of piston rings having six piston rings, disposed in respective grooves of the set of grooves. The six piston rings of the set of piston rings consist of the following rings in order from closest to the crown to farthest from the crown. The six piston rings includes a first compression ring including free ends defining a first end gap, a second compression ring including free ends defining a second end gap, a third compression ring, a fourth compression ring, a first oil ring, and a second oil ring. The first compression ring has a nominal wall thickness of 0.295±0.01 inches in a radial direction. The first end gap of the first compression ring is at or about 0.050±0.01 inches. The second end gap of the second compression ring is at or about 0.045±0.01 inches.

In another aspect of the present disclosure, a set of piston rings for an internal combustion engine is provided. The set of piston rings includes a first compression ring having free ends defining a first end gap, a second compression ring having free ends defining a second end gap, and a first oil ring. The first compression ring has a nominal wall thickness of 0.295±0.01 inches in a radial direction. The first end gap of the first compression ring is at or about 0.050±0.01 inches. The second end gap of the second compression ring is at or about 0.045±0.01 inches. The first compression ring is configured to be arranged on a piston such that the first compression ring is disposed closest to a crown of the piston and such that the second compression ring is disposed second closest to the crown.

In yet another aspect of the present disclosure, a method is provided. The method includes providing a first compression ring having free ends defining a first end gap. The method further includes providing a second compression ring having free ends defining a second end gap. The first compression ring includes a nominal value of the first end gap of the first compression ring is greater than a nominal value of the second end gap of the second compression ring. Of a ring set comprised of the first and second compression rings, the first compression ring is configured to be disposed closest to a crown of a piston, and the second compression ring is configured to be disposed second closest to the crown Other features and aspects of this disclosure will be apparent from the following description and the accompanying drawings.

BRIEF DESCRIPTION OF THE DRAWINGS

The accompanying drawings, which are incorporated in and constitute a part of the specification, are illustrative of one or more embodiments and, together with the description, explain the embodiments. The accompanying drawings have not necessarily been drawn to scale. Further, any values or dimensions in the accompanying drawings are for illustration purposes only and may or may not represent actual or preferred values or dimensions. Where applicable, some or all select features may not be illustrated to assist in the description and understanding of underlying features.

DETAILED DESCRIPTION

The description set forth below in connection with the appended drawings is intended as a description of various embodiments of the described subject matter and is not necessarily intended to represent the only embodiment(s). In certain instances, the description includes specific details for the purpose of providing an understanding of the described subject matter. However, it will be apparent to those skilled in the art that embodiments may be practiced without these specific details. In some instances, well-known structures and components may be shown in block diagram form in order to avoid obscuring the concepts of the described subject matter. Wherever possible, corresponding or similar reference numbers will be used throughout the drawings to refer to the same or corresponding parts.

Any reference in the specification to "one embodiment" or "an embodiment" means that a particular feature, structure, characteristic, operation, or function described in connection with an embodiment is included in at least one embodiment. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments, and it is intended that embodiments of the described subject matter can and do cover modifications and variations of the described embodiments.

It must also be noted that, as used in the specification, appended claims and abstract, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the described subject matter to any particular orientation or configuration. Furthermore, terms such as "first," "second," "third," etc. merely identify one of a number of portions, components, points of reference, operations or functions as described herein, and likewise do not necessarily limit embodiments of the described subject matter to any particular configuration, orientation, or sequence of functions or operations.

Figure 1:
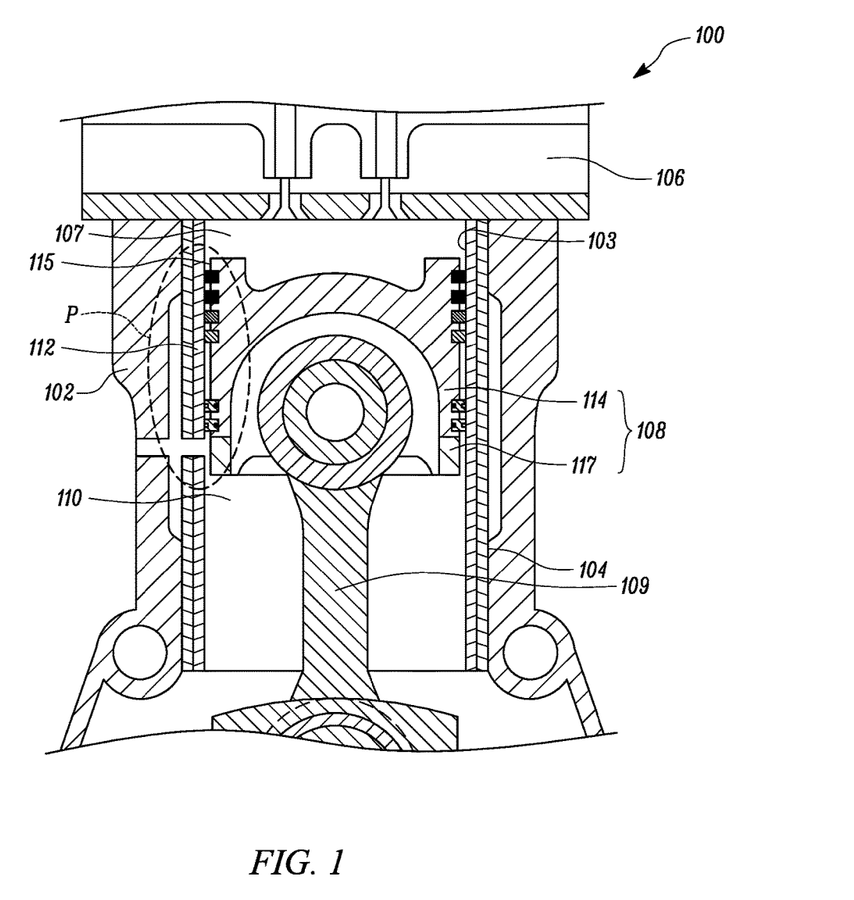
FIG. 1 is a cross sectional view of a portion of an internal combustion engine having a cylinder and a piston received therein according to one or more embodiments of the present disclosure.

FIG. 1 illustrates a cross sectional view of a portion of an internal combustion engine 100. The internal combustion engine 100 may embody a compression ignition engine, such as a diesel engine. Further, it may be understood that the internal combustion engine 100 may also embody other engines including, but not limited to, a spark ignition engine. The internal combustion engine 100 may be a four-stroke diesel engine, a two-stroke or a four-stroke gasoline engine, or a two-stroke or a four-stroke gaseous-powered engine, for instance.

The internal combustion engine 100 includes a cylinder block 102. The cylinder block 102 includes a liner 104 disposed inside the cylinder block 102. The internal combustion engine 100 further includes a cylinder head 106 connected to the cylinder block 102 to close-off an end of the liner 104. The cylinder block 102 includes a piston 108 inside a cylinder bore 110. The piston 108 is slidably disposed within the cylinder bore 110 and along the liner 104. The piston 108, together with the liner 104 and the cylinder head 106, define a combustion chamber 107 for the internal combustion engine 100. It may be understood that the internal combustion engine 100 may include any number of cylinder bores 110. Further, the cylinder bore 110 may be disposed in various configurations including, but not limited to, an "in-line" configuration, a "V" configuration, an opposing-piston configuration, or any other configuration.

The liner 104 of the cylinder block 102 can include a finish 112. The finish 112 may be adapted to maintain a desired thickness (not shown) of an oil film (not shown) on an inner surface 103 of the finish 112. In one or more embodiments, the finish 112 can include a core/kernel (Rk) range of about 40 to 100 micro inches, a peak height (Rpk) maximum of about 50 micro inches, and/or a valley depth (Rvk) range of about 32 to 100 micro inches. In one or more embodiments, a desired thickness of the oil film may be in a range of about 0.0001 to 0.001 inches.

The piston 108 is configured to reciprocate between a Bottom Dead Center (BDC) (not shown) and a Top Dead Center (TDC) (not shown) within the liner 104 inside the cylinder bore 110. The piston 108 includes a crown 114 at a top portion facing the TDC and a skirt 117 extending from the crown 114 at a bottom portion facing the BDC of the internal combustion engine 100. The piston 108 is pivotally connected to a connecting rod 109, which may in turn be pivotally connected to a crankshaft (not shown).

Figure 2:
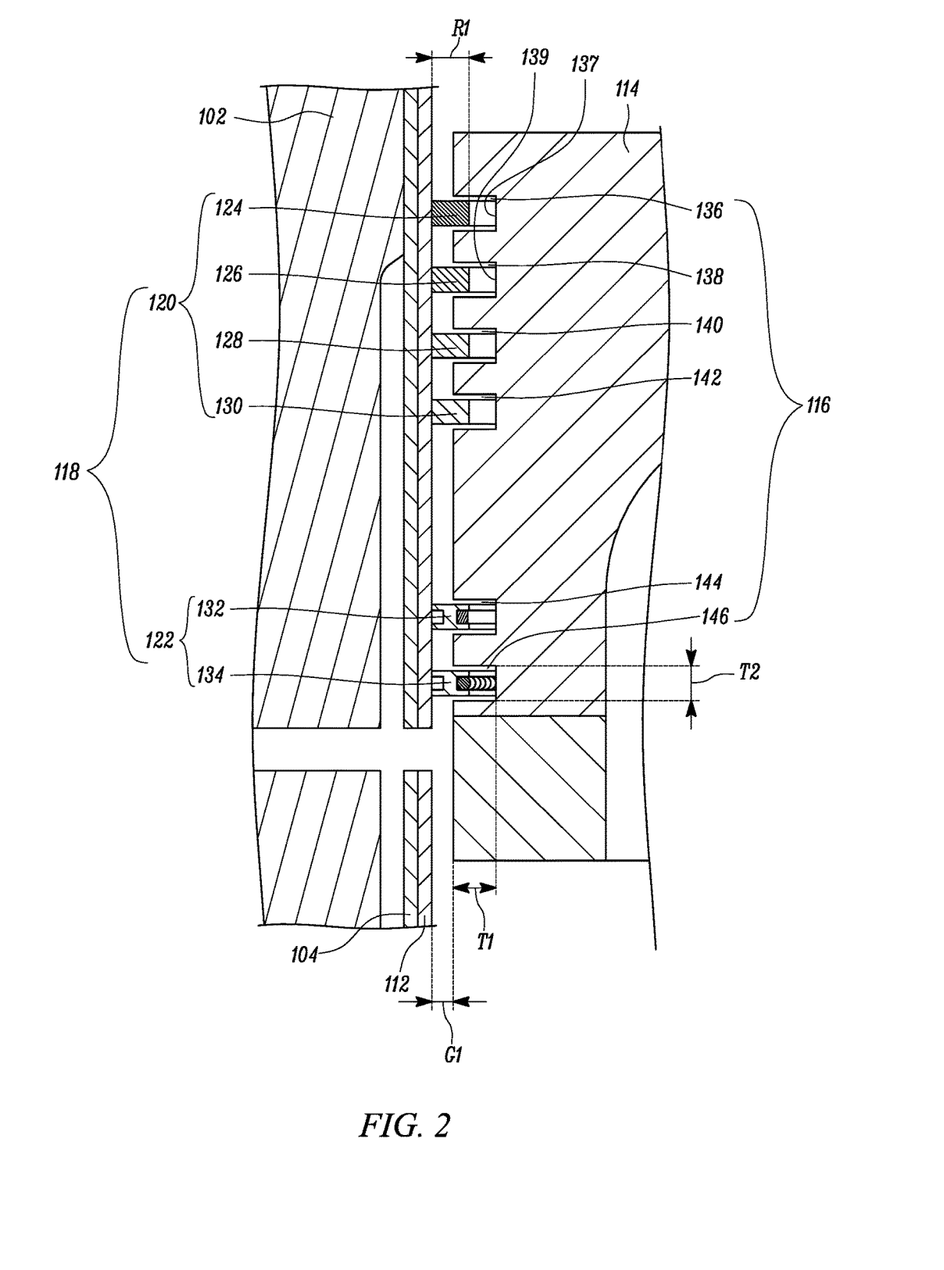
FIG. 2 is an enlarged view of a portion "P" of FIG. 1.

FIG. 2 illustrates an enlarged view of a portion "P" of the cylinder block 102 and the piston 108 of the FIG. 1. The portion "P" of the cylinder block 102 can include the liner 104 and the finish 112 on the liner 104, and the crown 114 of the piston 108. The piston 108 may have a cylindrical structure including a set of grooves 116 on the crown 114. The set of grooves 116 are formed at an outer annular surface 115 of the crown 114. The set of grooves 116 is adapted to accommodate a set of piston rings 118. Of course, FIGS. 1 and 2 show six grooves, but embodiments of the disclosed subject matter are not so limited, meaning that more than six grooves may be provided or less than six grooves may be provided. The set of piston rings 118 includes at least two compression rings and one or more oil or scraper rings. The at least two compression rings can be received in the set of grooves 116 defined in the crown 114 of the piston 108. In the present embodiment, the compression ring is a split ring. Like the grooves mentioned above, embodiments of the disclosed subject matter are not limited to six rings, meaning that more than six rings may be provided or less than six rings may be provided.

In the illustrated embodiment, the internal combustion engine 100 is a diesel engine that includes a total of six piston rings. The six piston rings include a set of compression rings 120 and a set of oil rings 122. The set of compression rings 120 includes four compression rings, though in one or more embodiments only two compression rings may be provided. The four compression rings embody a first compression ring 124, a second compression ring 126, a third compression ring 128, and a fourth compression ring 130. The set of piston rings 118 is adapted to seal a radial gap "G1" between the piston 108 and the finish 112, thereby maintaining desired pressure of gas inside the combustion chamber 107 during combustion process.

The set of oil rings 122 includes a first oil ring 132 and a second oil ring 134. The set of oil rings 122 allow oil to pass through the set of compression rings 120 and lubricate the inner surface 103 of the finish 112. The set of compression rings 120 are positioned from a top portion of the crown 114. The set of oil rings 122 are positioned below the set of compression rings 120 and farthest from the crown 114.

The crown 114 of the piston 108 accommodates the set of compression rings 120 and the set of oil rings 122 at respective grooves of the set of grooves 116. The set of grooves 116 includes a first groove 136, a second groove 138, a third groove 140, a fourth groove 142, a fifth groove 144, and a sixth groove 146. The piston rings 118 of the set are disposed in respective grooves of the set of grooves 116. Further, the set of piston rings 118 is disposed in order from closest to the crown 114 of the piston 108 to farthest from the crown 114 of the piston 108.

The first compression ring 124 is disposed at the first groove 136, closest to the crown 114. In one or more embodiments, the first compression ring 124 includes a nominal wall thickness "R1" of about 0.295±0.01 inches in a radial direction. The first compression ring 124 is accommodated in the first groove 136 of the set of grooves 116, which may have a radial thickness "T1" of about 0.38 inches. The second compression ring 126 is disposed at the second groove 138, the third compression ring 128 is disposed at the third groove 140, the fourth compression ring 130 is disposed at the fourth groove 142, the first oil ring 132 is disposed at the fifth groove 144, also referred as 'the first oil ring groove' and the second oil ring 134 is disposed at the sixth groove 146, also referred as 'the second oil ring groove.'

The crown 114 of the piston 108 includes the set of grooves 116 for accommodating the set of compression rings 120 and the set of oil rings 122. Each groove of the set of grooves 116 includes the radial thickness "T1," some or all of which may be about 0.38 inches and an axial thickness "T2" of about 0.196 inches. In one or more embodiments, the radial thickness "T1" of each groove of the set of grooves 116 is uniform and a rectangular cross sectional in shape. Alternatively, in one or more embodiments, the radial thickness "T1" of each groove of the set of grooves 116 may be non-uniform, or at least one groove may have a different radial thickness as compared to the other grooves.

Figure 3:
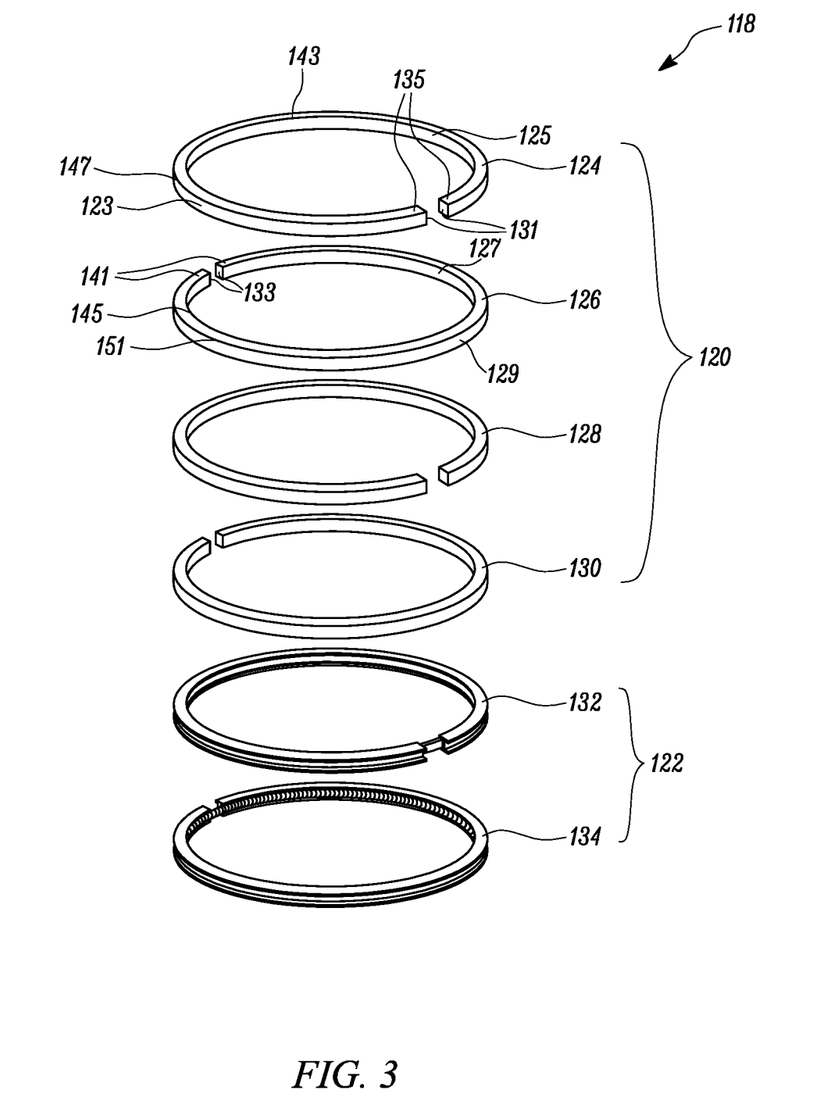
FIG. 3 is an exploded view of a set of piston rings according to one or more embodiments of the present disclosure.
Figure 4:
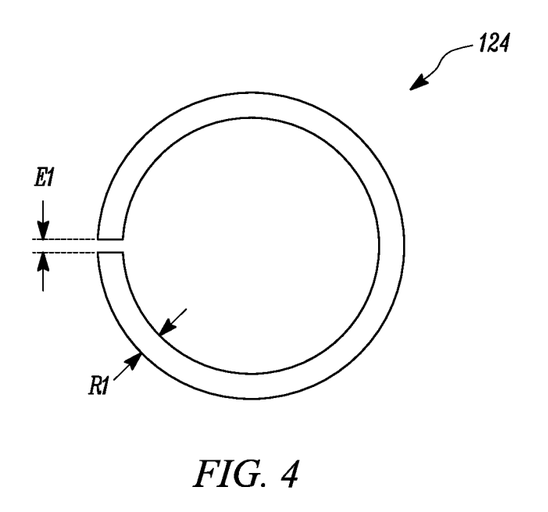
FIG. 4 is a plan view of a first compression ring of the set of piston rings of FIG. 3, according to one or more embodiments of the present disclosure.
Figure 5:
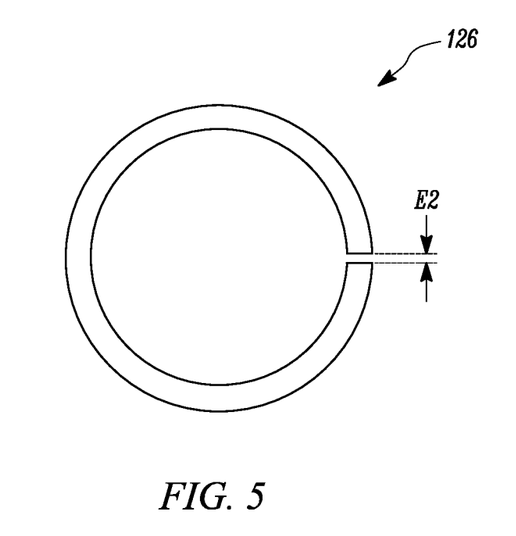
FIG. 5 is a plan view of a second compression ring of the set of piston rings of FIG. 3, according to one or more embodiments of the present disclosure.

FIG. 3 illustrates an exploded view of the set of piston rings 118, according to one or more embodiments of the present disclosure. The set of piston rings 118 includes the set of compression rings 120 and the set of oil rings 122. In FIG. 3, the set of compression rings 120 includes four compression rings. The four compression rings include the first compression ring 124, the second compression ring 126, the third compression ring 128, and the fourth compression ring 130. The first compression ring 124 includes free ends 135, which may be flat and face each other, defining a first end gap "E1" (shown in FIG. 4). The first end gap "E1" of the first compression ring 124 is referred as a gap between the free ends 135 of the first compression ring 124. The first end gap "E1" of the first compression ring 124 is at or about 0.050±0.01 inches. The first compression ring 124 includes the nominal wall thickness "R1" (shown in FIG. 4) of about 0.295±0.01 inches in the radial direction. The second compression ring 126 includes free ends 141, which may be flat and face each other, defining a second end gap "E2" (shown in FIG. 5). The second end gap "E2" of the second compression ring 126 is referred as a gap between the free ends 141 of the second compression ring 126. The second end gap "E2" of the second compression ring 126 is at or about 0.045±0.01 inches. In one or more embodiments, a ratio of the first end gap "E1" of the first compression ring 124 to the second end gap "E2" of the second compression ring 126 is in a range of about 1.0 to about 1.2. Thus, a nominal value of the first end gap E1 can be greater than a nominal value of the second end gap E2.

In FIG. 3, each of the free ends 135 of the first compression ring 124 includes a flat surface 131 that face each other. Of course, the free ends 135 may not be flat, but rather have a point, for instance. Similarly, each of the free ends 141 of the second compression ring 126 includes a flat surface 133 that face each other. Of course, the free ends 141 may not be flat, but rather have a point, for instance.

The first compression ring 124 includes an inner surface 125 defining an inner circumference 143. Generally speaking, the inner surface 125 runs parallel to an outer surface 137 of the first groove of the set of grooves 116 having the first compression ring 124 disposed therein. The second compression ring 126 includes an inner surface 127 defining an inner circumference 145. Generally speaking, the inner surface 127 runs parallel to an outer surface 139 of the second groove 138 of the set of grooves 116 having the second compression ring 126 disposed therein. The first compression ring 124 also includes an outer surface 123 defining an outer circumference 147. Generally speaking, the outer surface 123 can run parallel to the inner surface 103 (shown in FIG. 1) of the finish 112. The second compression ring 126 also includes an outer surface 129 defining an outer circumference 151. Generally speaking, the outer surface 129 can run parallel to the inner surface 103 of the finish 112. In one or more embodiments, the set of piston rings 118 may be made of an iron base material.

Ring surface of the first compression ring 124 and the second compression ring 126 may have a symmetrical barrel-shape in order to generate a uniform and controlled oil layer on the finish 112, for instance. The ring surface of the first compression ring 124 and the second compression ring 126 may be face-coated with ceramic chrome plating to sustain long-term operation of ring. In one or more embodiments, a ratio of the nominal wall thickness "R1" (shown in FIG. 4) of the first compression ring 124 to the radial thickness "T1" (shown in FIG. 4) of the first groove 136 having the first compression ring 124 disposed therein may be in a range of about 0.5 to about 0.9.

Figure 6:
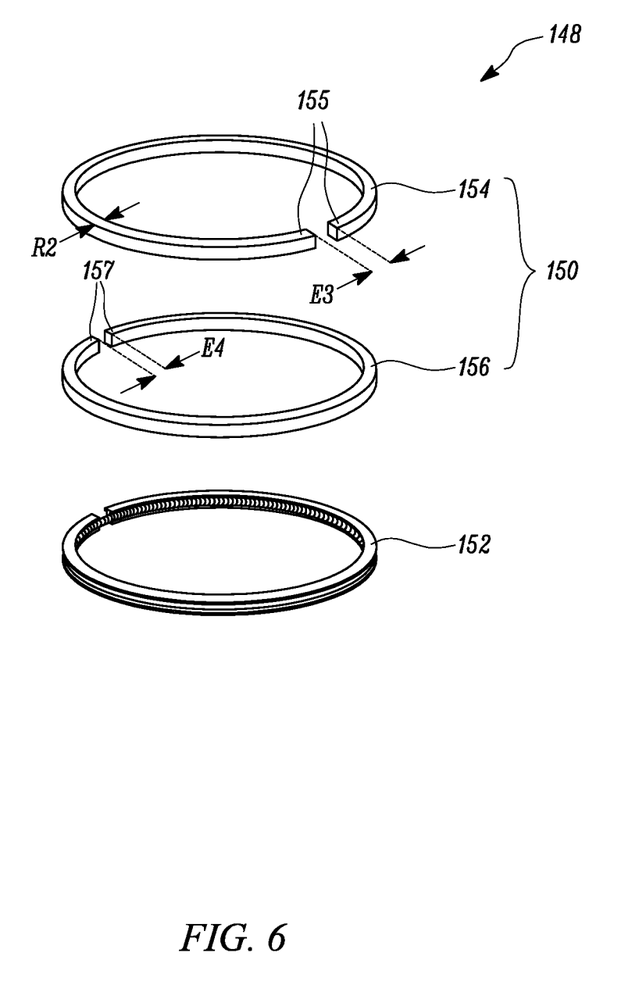
FIG. 6 is an exploded view of a set of piston rings according to one or more embodiments of the present disclosure.

FIG. 6 illustrates an exploded view of a set of piston rings 148, according to one or more embodiments of the present disclosure. The set of piston rings 148 includes a set of compression rings 150. The set may also include an oil ring 152. The set of compression rings 150 includes a first compression ring 154 and a second compression ring 156. The set of piston rings 148 can be disposed in order from closest to the crown 114 of the piston 108 to farthest from the crown 114 of the piston 108. More specifically, at least compression ring 154 is configured to be closest to the crown 114 of the piston 108, and compression ring 156 is configured to be second closest to the crown 114.

The first compression ring 154 includes free ends 155 defining a first end gap "E3." The second compression ring 156 includes free ends 157 defining a second end gap "E4." Additionally, the first end gap E3 can be greater than the second end gap E4. For example, the first end gap "E3" of the first compression ring 154 can be at or about 0.050±0.01 inches, and the second end gap "E4" of the second compression ring 156 can be at or about 0.045±0.01 inches. In one or more embodiments, a ratio of the first end gap "E3" of the first compression ring 154 to the second end gap "E4" of the second compression ring 156 can be in a range from about 1.0 to about 1.2. The first compression ring 154 can include a nominal wall thickness "R2" of about 0.295±0.01 inches in a radial direction. In one or more embodiments, the first compression ring 154 and the second compression ring 156 are made of metal or alloy.

INDUSTRIAL APPLICABILITY

The set of piston rings 118, 148 and the liner 104 having the finish 112 described in the present disclosure, are used in the internal combustion engine 100, particularly in a diesel engine, for reducing particulate material emissions and blow-by combustion gases during the combustion process. The particulate material emissions and the blow-by combustion gases can be reduced by maintaining an oil film layer on the finish 112, i.e., on contacting surface of the set of piston rings 118, 148 and the finish 112. As the set of compression rings 120, 150 of the set of piston rings 118, 148 are adapted to expand radially, the outer surface of each of the set of compression rings 120, 150 can conform to the surface of the finish 112, i.e., the inner surface 103 of the finish 112. Each of the compression rings 120, 150 may be used for sealing the combustion chamber 107 and thus to prevent transfer of gases from the combustion chamber 107 to a crank case. Each of the compression rings 120, 150 may also be used for supporting heat transfer from the piston 108 to the liner 104, and to regulate engine oil consumption.

Figure 7:
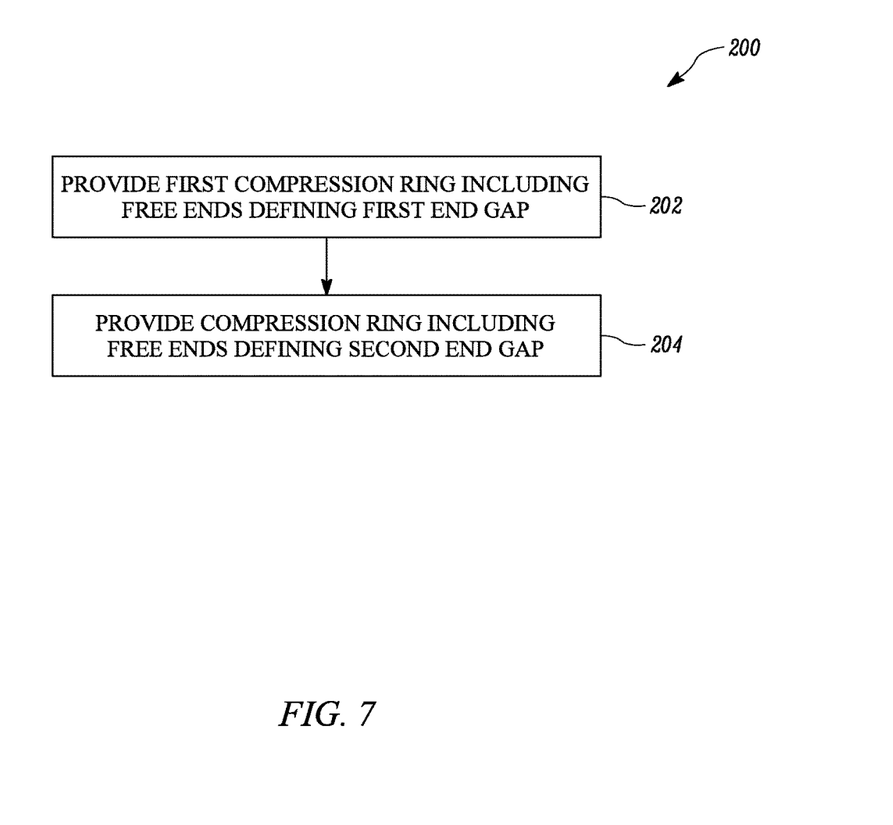
FIG. 7 is a flowchart of a method of providing a plurality of piston rings according to one or more embodiments of the present disclosure.

FIG. 7 illustrates a flowchart of a method 200 of providing a set of piston rings, such as the sets of piston rings 118, 148 discussed above. The set of piston rings 118 is considered for illustration purpose of the present disclosure.

The method 200 includes at step 202 providing a first compression ring, such as compression ring 124 of the set of compression rings 120. Optionally, the first compression ring 124 may be provided in the first groove 136 of the crown 114 of the piston 108. The first compression ring 124 includes the free ends 135 defining the first end gap "E1." The first compression ring 124 is disposed closest to the crown 114 of the piston 108. The method 200 may further include providing the first compression ring 124 in such a way that the nominal wall thickness "R1" of the first compression ring 124 is about 0.295±0.01 inches in the radial direction. The first end gap "E1" in the first compression ring 124 may be at or about 0.050±0.01 inches.

Further, at step 204 the method 200 includes providing a second compression, such as compression ring 126. Optionally, the second compression ring may be provided in the second groove 138. The second compression ring 126 also includes free ends 141 defining the second end gap "E2." The second compression ring 126 is disposed immediately below the first compression ring 124. A nominal value of the first end gap "E1" of the first compression ring 124 can be greater than a nominal value of the second end gap "E2" of the second compression ring 126. The method 200 may further include providing the second compression ring 126 having the second end gap "E2" at or about 0.045±0.01 inches.

While aspects of the present disclosure have been particularly shown and described with reference to the embodiments above, it will be understood by those skilled in the art that various additional embodiments may be contemplated by the modification of the disclosed machines, systems and methods without departing from the scope of what is disclosed. Such embodiments should be understood to fall within the scope of the present disclosure as determined based upon the claims and any equivalents thereof.

What is claimed is:

1. An internal combustion engine comprising:
a cylinder including a liner and a finish on the liner;
a piston disposed in the cylinder, the piston including a crown and defining six grooves; and
six piston rings, each piston ring of the six piston rings being disposed in a respective groove of the six grooves,
wherein the six piston rings consist of the following rings in order from closest to the crown to farthest from the crown:
a first compression ring including free ends defining a first end gap,
a second compression ring including free ends defining a second end gap,
a third compression ring,
a fourth compression ring,
a first oil ring, and
a second oil ring,
wherein the first compression ring has a nominal wall thickness of 0.295±0.01 inches along a radial direction,
wherein the six grooves includes a first groove, and the first compression ring is disposed in the first groove,
wherein a ratio of the nominal wall thickness of the first compression ring to a radial depth of the first groove is in a range from 0.5 to 0.9; and
wherein the first compression ring and the second compression ring are configured to seal a radial gap between the piston and the finish around the cylinder.

2. The internal combustion engine of claim 1, wherein each groove of the six grooves has a radial depth of 0.38 inches and an axial height of 0.196 inches.

3. The internal combustion engine of claim 1, wherein the finish includes a core/kernel (Rk) range of 40 to 100 micro inches, a peak height (Rpk) maximum of 50 micro inches, and a valley depth (Rvk) range of 32 to 100 micro inches average.

4. The internal combustion engine of claim 1, wherein a ratio of the first end gap of the first compression ring to the second end gap of the second compression ring is in a range from 1.0 to 1.2.

5. The internal combustion engine of claim 4,
wherein the first end gap of the first compression ring is 0.050±0.01 inches,
wherein the second end gap of the second compression ring is 0.045±0.01 inches; and
wherein the first compression ring and the second compression ring are configured to seal the radial gap between the piston and the finish on the liner without additional sealing members positioned within the first ring groove or the second ring groove.

6. The internal combustion engine of claim 1,
wherein each of the free ends of the first compression ring includes a flat surface, the flat surfaces facing each other, and
wherein each of the free ends of the second compression ring includes a flat surface, the flat surfaces facing each other.

7. The internal combustion engine of claim 1,
wherein the first compression ring comprises an inner surface defining an inner circumference, and
wherein the inner surface is parallel to an outer surface of the first groove.

8. The internal combustion engine of claim 1,
wherein the second compression ring comprises an inner surface defining an inner circumference, wherein the six grooves further includes a second groove, and the second compression ring is disposed in the second groove, and
wherein the inner surface is parallel to an outer surface of the second groove.

9. The internal combustion engine of claim 1,
wherein the first compression ring includes an outer surface defining an outer circumference, and
wherein the outer surface is parallel to an inner surface of the liner.

10. The internal combustion engine of claim 1,
wherein the second compression ring includes an outer surface defining an outer circumference, and
wherein the outer surface is parallel to an inner surface of the liner.

11. A method comprising:
providing a first compression ring having free ends defining a first end gap;
providing a second compression ring having free ends defining a second end gap;
providing a piston including a crown and defining a first ring groove and a second ring groove, the first ring groove being disposed closer to the crown than the second ring groove;
installing the first compression ring in the first ring groove; and
installing the second compression ring in the second ring groove,
wherein a nominal value of the first end gap of the first compression ring is greater than a nominal value of the second end gap of the second compression ring,
wherein the first compression ring has a nominal wall thickness of 0.295±0.01 inches along a radial direction,
wherein a ratio of the nominal wall thickness of the first compression ring to a radial depth of the first ring groove is in a range from 0.5 to 0.9; and
wherein the first compression ring and the second compression ring are configured to seal a radial gap between the piston and a finish around a cylinder block without additional sealing members positioned within the first ring groove or the second ring groove.

12. The method of claim 11, further comprising:
providing the first compression ring with a nominal wall thickness of 0.295±0.01 inches along the radial direction and a first end gap 0.050±0.01 inches; and
providing the second compression ring with a second end gap 0.045±0.01 inches.

13. A piston assembly for an internal combustion engine, the piston assembly comprising:
a piston including a crown and defining a first ring groove, a second ring groove, and a third ring groove, the first ring groove being located closer to the crown than the second ring groove, the second ring groove being located closer to the crown than the third ring groove;
a first compression ring disposed in the first ring groove, the first compression ring including free ends that define a first end gap;
a second compression ring disposed in the second ring groove, the second compression ring including free ends that define a second end gap; and
an oil ring disposed in the third ring groove,
wherein the first compression ring has a nominal wall thickness of 0.295±0.01 inches along a radial direction,
wherein a ratio of the nominal wall thickness of the first compression ring to a radial depth of the first ring groove is in a range from 0.5 to 0.9;
wherein the first end gap is 0.050±0.01 inches and the second end gap is 0.045±0.01 inches; and
wherein the first compression ring and the second compression ring are configured to seal a radial gap between the piston and a finish around a cylinder block.

14. The method of claim 11, wherein a ratio of the first end gap of the first compression ring to the second end gap of the second compression ring is in a range of 1.0 to 1.2.

15. The piston assembly of claim 13,
wherein each of the free ends of the first compression ring includes a flat surface, the flat surfaces facing each other, and
wherein each of the free ends of the second compression ring includes a flat surface, the flat surfaces facing each other.

16. The piston assembly of claim 13,
wherein the first compression ring comprises an inner surface defining an inner circumference, and
wherein the inner surface is parallel to an outer surface of the first ring groove.

17. The piston assembly of claim 13,
wherein the second compression ring comprises an inner surface defining an inner circumference, and
wherein the inner surface is parallel to an outer surface of the second groove.

18. The piston assembly of claim 13, wherein the first compression ring and the second compression ring are made of a metal or a metal alloy.

* * * * *